Jan. 26, 1943.   H. J. MATTESON   2,309,405
REFRIGERANT CONTROL VALVE
Filed Nov. 27, 1940
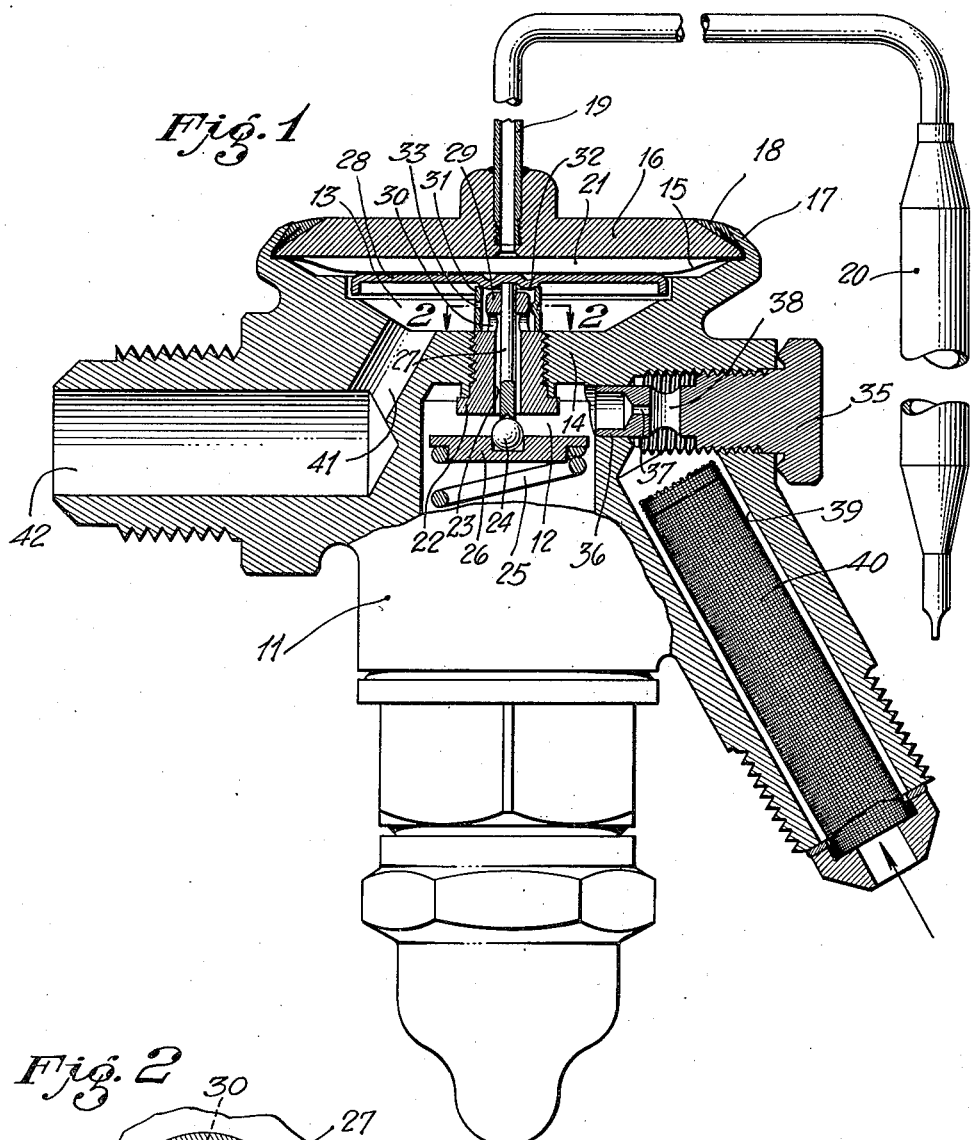
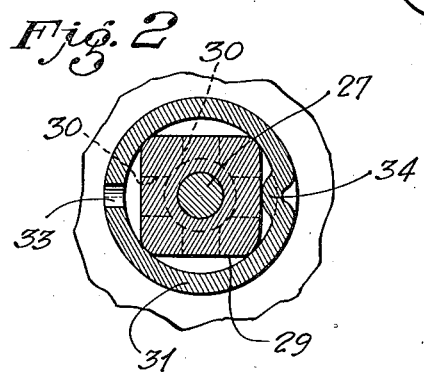
HAROLD J. MATTESON,
INVENTOR;
By John H. Rouse,
ATTORNEY.

Patented Jan. 26, 1943

2,309,405

UNITED STATES PATENT OFFICE 2,309,405

REFRIGERANT CONTROL VALVE

Harold J. Matteson, Glendale, Calif., assignor to General Controls Co., Glendale, Calif., a corporation of California Application November 27, 1940, Serial No. 367,320

3 Claims. (Cl. 236—92)

My present invention relates generally to fluid control valves and more particularly to refrigerant-control expansion valves. Such valves, of usual construction, include a motor for actuating the closure member of the valve, which motor is operated by the fluid pressure produced in a thermal bulb responsive to the temperature of the cooling unit of the refrigerator. Before the system is put into operation, the thermal bulb is at atmospheric temperature and accordingly the closure member is in full open position, with the result that there will be an initial abnormal surge of refrigerant through the valve which may cause damage in the system. Such a condition may also exist after manual defrosting. It is therefore an object of my invention to provide means in a valve of the type described for limiting fluid flow therethrough when its associated thermal bulb is abnormally heated.

Another object of the invention is the provision of means, operated in response to pressure in excess of normal in the motor of a refrigerant control valve of the type described, for closing the normal passage through the valve, a restricted opening being provided through which the refrigerant can then flow.

Other objects and advantages of my invention will be found in the description, the drawing, and the appended claims.

For complete understanding of the invention, reference may be had to the following detailed description and accompanying drawing, wherein:

Figure 1 is a view, mainly in section, of a thermostatically controlled expansion valve embodying my invention; and Figure 2 is a fragmentary section taken along the line 2—2 of Fig. 1.

In the drawing, the numeral 11 indicates a valve casing having an inlet 12 and an outlet 13 separated by a partition 14. Closing the upper end of the casing is a flexible metallic diaphragm 15 and a cylindrical diaphragm cover 16. The portion of the casing which extends above this cover is rolled over as indicated at 17 to securely hold the diaphragm and its cover, the annular space between the cover and the rolled-over portion of the casing being filled with solder 18. Threaded and soldered in a central opening in the cover is the stem 19 of a thermal bulb 20 which contains a volatile fluid. The pressure of this fluid is applied to a chamber 21 defined by the diaphragm and the underside of the cover, which pressure tends to force the diaphragm downward upon increase of bulb temperature. The parts are shown in the drawing in the positions reached when the bulb is at atmospheric temperature and the difference in pressure between chambers 21 and 13 is in excess of normal.

Threaded in an opening in the partition 14 is a member 22 having a valve port opening or aperture 23. Cooperable with the lower end of the aperture 23 to control fluid flow through the valve is a ball 24 which is urged toward closed position by a compression spring 25, a disk 26 having a central recess for receiving the ball being interposed between the spring and the ball. The upper portion of the aperture 23 is reduced in diameter as a guide for a rod 27 which serves to transmit movement of the diaphragm 15 to the valve ball 24, the rod extending between the ball and the underside of a pusher-plate 28 provided below the diaphragm.

The portion 29 of member 22 above the partition 14 is substantially square in cross-section, as shown in Fig. 2, and is provided in its sides with openings 30 communicating with the upper unreduced portion of the aperture 23. Around the squared portion 29 is a tubular member 31 which is held in position by frictional engagement with the rounded corners of the square. The upper end of this member extends slightly above the top of the squared portion, and its lower end is in close engagement with the surface of member 22 surrounding the squared portion. The pusher-plate 28 is depressed toward its center to provide an annular portion 32, the outer surface of which is adapted to engage and thus close the upper end of the tubular member when pressure in excess of normal exists in the diaphragm chamber 21 and the parts are accordingly in the positions shown. The annular portion 32 surrounds the upper end of rod 27 and thus limits lateral movement of the pusher plate. The tubular member 31 has a restricted opening 33 through its wall which affords the only connection between the inlet and the outlet of the valve when the upper end of this member is closed. To prevent the possibility of obstruction of the opening 33 by a corner of the squared portion, a depression 34 is made in the wall of the tubular member opposite the opening which prevents rotation of this member.

Threaded in an opening in a side wall of the valve casing is a member 35 having a reduced cylindrical inner end portion 36 which is a close fit in an opening communicating with the inlet chamber 12. The inner end of this member is concentrically bored, the continuation of the bore being reduced to provide a restricted orifice 37 which communicates with a transverse opening 38 through the member, which opening in turn communicates with a main inlet passage 39 wherein is mounted a strainer 40.

When the refrigerating system is in normal operation, the bulb 20 is at a temperature such that the fluid pressure in chamber 21 above the diaphragm is more or less balanced by the fluid pressure in chamber 13 and the force of spring 25 acting through the valve ball 24, rod 27, and pusher-plate 28. When the bulb temperature is below a predetermined degree, the valve ball is in its raised position, closing the lower end of the aperture 23. Upon rise of temperature at the bulb, the resulting increase of fluid pressure forces the diaphragm downward, opening the valve. Refrigerant can then flow through inlet passage 39, opening 38, orifice 37, inlet chamber 12, aperture 23, openings 30, space between portion 29 and tubular member 31, open upper end of member 31, outlet chamber 13, and outlet passages 41 and 42.

As previously pointed out, when the pusher-plate is in its downmost position due to pressure in the diaphragm chamber in excess of normal, as the upper end of the tubular member 31 is closed, the refrigerant must pass through the restricted opening 33, the flow capacity of which is preferably less than that of the inlet orifice 37, with the result that refrigerant flow through the system is reduced to a safe amount for initial operation. It is not until the system is in normal operation and the bulb temperature has been substantially reduced that greater flow is permitted.

While I have herein shown and described my invention as embodied in a specific form of refrigerant control valve, it is obviously also adapted to other fluid control purposes. I intend therefore that the invention be limited only by the scope of the appended claims.

I claim as my invention:

1. In a thermostatically controlled expansion valve: a casing having an inlet and an outlet, a partition separating said inlet and said outlet and having an aperture therethrough, a closure member cooperable with the inlet end of said aperture to control fluid flow through the valve and biased to closed position, a thermostatically-controlled fluid-pressure-operated motor in said outlet, means extending through said aperture and interconnecting said motor and said closure member whereby the same is moved to open position upon increase of pressure in said motor, means forming an extension of said partition at the outlet end of said aperture for guiding said interconnecting means, a tubular member supported by said extension and surrounding the outlet end of said aperture, said tubular member providing a main opening and a restricted opening through which openings all the fluid controlled by said closure member must pass, and means operated by the motor when the same is subjected to pressure in excess of normal for closing said main opening.

2. In a thermostatically controlled expansion valve: a casing having an inlet and an outlet, a partition separating said inlet and said outlet and having an aperture therethrough, a closure member cooperable with the inlet end of said aperture to control fluid flow through the valve and biased to closed position, a thermostatically-controlled fluid-pressure-operated motor in said outlet, said motor including a pusher-plate, a rod freely extending through said aperture and interconnecting said pusher-plate and said closure member whereby the same is moved to open position upon increase of pressure in said motor, means forming an extension of said partition at the outlet end of said aperture for guiding said rod, a tubular member supported by said extension and surrounding the outlet end of said aperture, said tubular member being open at its end away from said partition, said pusher-plate being engageable with said open end of the tubular member to close the same when the motor is subjected to pressure in excess of normal, and means forming a restricted opening through which all the fluid controlled by said closure member must pass when the open end of the tubular member is closed by the pusher-plate.

3. In a thermostatically controlled expansion valve: a casing having an inlet and an outlet, a partition separating said inlet and said outlet, a valve-port member threaded in an opening through said partition and having an aperture therethrough interconnecting said inlet and said outlet, a closure member cooperable with the inlet end of said aperture to control fluid flow through the valve and biased to closed position, a thermostatically-controlled fluid-pressure-operated motor in said outlet and including a pusher-plate, a rod freely extending through said aperture and interconnecting said pusher-plate and said closure member whereby the same is moved to open position against the force of said bias upon increase of pressure in said motor, said valve-port member having a portion extending outwardly of the outlet end of said partition opening, a tubular member supported by said portion of the valve-port member and surrounding the outlet end of said aperture, said tubular member being open at its end away from said partition, said pusher-plate being engageable with said open end of the tubular member to close the same when the motor is subjected to pressure in excess of normal, and means forming a restricted opening through which all the fluid controlled by said closure member must pass when the open end of the tubular member is closed by the pusher-plate.

HAROLD J. MATTESON.